(No Model.)

S. CUTLER.
APPARATUS FOR HEATING AND CIRCULATING WATER, &c.

No. 433,330.  Patented July 29, 1890.

WITNESSES.  INVENTOR.

UNITED STATES PATENT OFFICE.

SAMUEL CUTLER, OF MILLWALL, COUNTY OF MIDDLESEX, ENGLAND.

APPARATUS FOR HEATING AND CIRCULATING WATER, &c.

SPECIFICATION forming part of Letters Patent No. 433,330, dated July 29, 1890.

Application filed January 9, 1890. Serial No. 336,377. (No model.)

*To all whom it may concern:*

Be it known that I, SAMUEL CUTLER, engineer, a subject of the Queen of Great Britain, residing at Millwall, in the county of Middlesex, England, have invented new and useful Improvements in Apparatus for Heating and Circulating Water or other Liquids in the Cups of Gas-Holders, of which the following is a specification, reference being had to the accompanying drawings.

The object of this invention is to construct apparatus whereby the water or other liquid in the cups of gas-holders may be heated and caused to circulate not only horizontally, but to some extent vertically or diagonally, and thus assist in eliminating the gaseous constituents or prevent freezing and the dangers attendant thereon.

In order that the invention may be easily understood, drawings are attached hereto.

Figure 2:
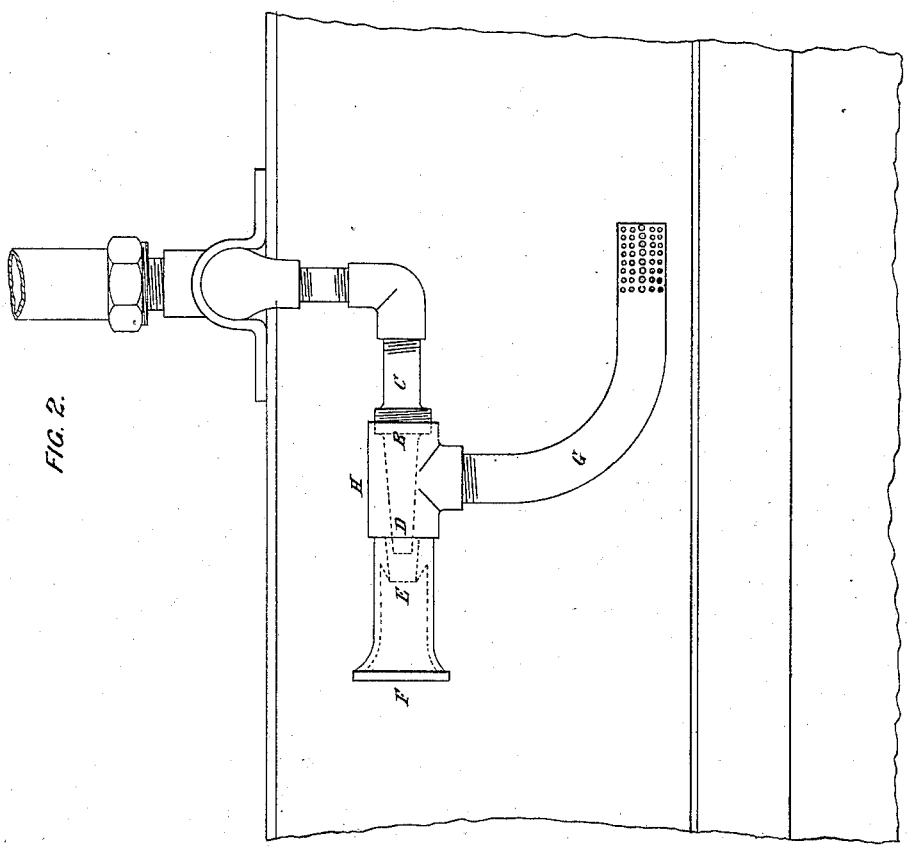
Figure 1:
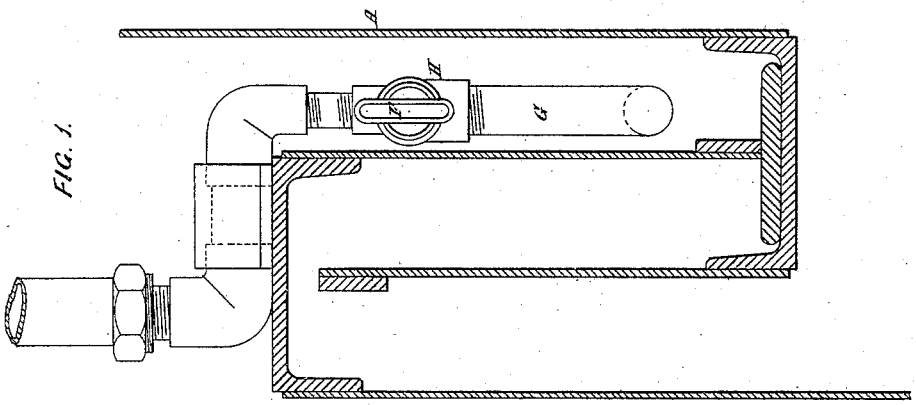

Figure 1 is a transverse vertical section of a gas-holder grip and cup, with an end elevation of the improved apparatus applied to the cup; and Fig. 2 is a side elevation of the improved apparatus, the side plate A of the gas-holder being removed.

In each of the views similar letters refer to the same parts.

To carry out the invention I make the apparatus principally of wrought-iron steam or gas pipe, as follows: Into one of the horizontal ends B of a T-piece H is screwed a steam-pipe C, the inner extremity of which is either drawn down to or fitted with a nozzle D, which is shown in dotted lines. To the other end of the T-piece a short pipe E, with a circular, bell, flattened, or other suitably-shaped mouth-piece F, is screwed, and depending from the lower part of the opening of the T-piece is a curved pipe G, which is either open at its lower extremity or closed and provided with a number of holes round its circumference.

This apparatus is hung, as shown, or otherwise supported in the water or other liquid within the gas-holder cup, and upon steam being admitted through the steam-pipe it issues from the nozzle with such force as to cause a vacuum in the T-piece, which acts as a vacuum-chamber, thereby inducing the cold water or liquid from below to rise and issue from the mouth-piece with considerable force and in a heated state. The result is that the water or liquid is both heated and kept in circulation, in some cases giving off the gaseous elements, while in others freezing is prevented. Where the cups are large, this apparatus may be multiplied and attached to any number of points deemed desirable.

When the apparatus is used for heating liquid in stills or other vessels, it may be found advantageous to use, instead of the bell-mouthed or flattened pipe, a pipe closed at its extremity, but provided with a number of perforations round its side.

Although the apparatus is spoken of as being made of wrought-iron, any other suitable material or materials or a combination of them may be used.

What I claim as my invention is—

In an apparatus for heating and circulating a liquid in the cups of gas-holders, the combination of the T-piece H, the steam-pipe C, attached to one end on said T-piece and provided with a nozzle D, extended through said piece, the pipe E, attached to the other end of the T-piece and provided with a mouth-piece F, and the pipe G, having one end attached to the T-piece outside the nozzle of the steam-pipe and its other end communicating with the body of the liquid to be heated, and in which the heating and circulating apparatus is immersed, substantially as described.

In testimony whereof I have hereunto signed my name in the presence of two subscribing witnesses.

SAMUEL CUTLER.

Witnesses:
W. H. BENNETT,
WM. THOS. MARSHALL.